United States Patent
Bourbigot et al.

(10) Patent No.: US 9,499,685 B2
(45) Date of Patent: *Nov. 22, 2016

(54) POLYURETHANE FLAME RETARDANT FORMULATION

(75) Inventors: Serge Bourbigot, Villeneuve d'Ascq (FR); Sophie Duquesne, Saint-Andre-lez-Lille (FR); Fabienne Samyn, Arras (FR); Maryska Muller, Lille (FR); Chris Ian Lindsay, Tervuren (BE); Rene Alexander Klein, Hoegaarden (BE); Giacomo Giannini, The Woodlands, TX (US)

(73) Assignee: Huntsman International LLC, The Woodlands, TX (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/002,155

(22) PCT Filed: Feb. 9, 2012

(86) PCT No.: PCT/EP2012/052223
§ 371 (c)(1),
(2), (4) Date: Aug. 29, 2013

(87) PCT Pub. No.: WO2012/116885
PCT Pub. Date: Sep. 7, 2012

(65) Prior Publication Data
US 2013/0338248 A1    Dec. 19, 2013

(30) Foreign Application Priority Data
Mar. 2, 2011 (EP) ..................... 11156519

(51) Int. Cl.
| | | |
|---|---|---|
| C08K 13/02 | (2006.01) |
| C08G 18/10 | (2006.01) |
| C08J 9/14 | (2006.01) |
| C08K 5/3492 | (2006.01) |
| C08K 3/00 | (2006.01) |
| C08K 5/529 | (2006.01) |
| C08G 101/00 | (2006.01) |
| C08K 3/22 | (2006.01) |
| C08K 3/32 | (2006.01) |

(52) U.S. Cl.
CPC ............. *C08K 13/02* (2013.01); *C08G 18/10* (2013.01); *C08J 9/146* (2013.01); *C08K 3/0058* (2013.01); *C08K 3/22* (2013.01); *C08K 3/32* (2013.01); *C08K 5/34928* (2013.01); *C08K 5/529* (2013.01); *C08G 2101/0025* (2013.01); *C08J 2375/04* (2013.01); *C08K 2003/222* (2013.01); *C08K 2003/323* (2013.01); *C08K 2201/011* (2013.01)

(58) Field of Classification Search
CPC .......... C08L 75/04; C08G 2101/0008; C08G 2101/0016; C08G 2101/0025; C08G 2150/00; C08G 2150/60; C08K 3/22; C08K 3/32; C08K 3/0058; C08K 5/34925; C08K 5/529; C08K 5/5205; C08K 5/52; C08K 13/02; C08K 2003/222; C08K 2003/2227; C08K 2003/323; C08K 2201/011; C08J 2375/04
See application file for complete search history.

(56) References Cited

U.S. PATENT DOCUMENTS

| | | | |
|---|---|---|---|
| 4,131,731 A | 12/1978 | Lai et al. | |
| 4,347,334 A | 8/1982 | Staendeke et al. | |
| 4,467,056 A | 8/1984 | Staendeke et al. | |
| 4,514,328 A | 4/1985 | Staendeke et al. | |
| 4,639,331 A | 1/1987 | Elsner et al. | |
| 4,879,320 A * | 11/1989 | Hastings | 523/179 |
| 4,977,194 A * | 12/1990 | Haas et al. | 521/99 |
| 5,721,281 A * | 2/1998 | Blount | 521/50 |
| 6,015,510 A | 1/2000 | Jacobson et al. | |
| 2005/0256234 A1 | 11/2005 | Kurumatani et al. | |

FOREIGN PATENT DOCUMENTS

| | | |
|---|---|---|
| CN | 101463122 A | 6/2009 |
| CN | 101475741 A | 7/2009 |
| EP | 0512629 A | 11/1992 |
| EP | 1516907 A | 3/2005 |

OTHER PUBLICATIONS

A Morgan and M. Bundy, "Cone calorimeter analysis of UL-94 V-rated plastics" Fire and Materials, v. 31, p. 257-283 (2007).

* cited by examiner

*Primary Examiner* — John Cooney
(74) *Attorney, Agent, or Firm* — Robert A. Diaz

(57) ABSTRACT

The invention relates to a formulation suitable to provide polyurethane, the formulation comprising
(a) at least one polyurethane forming mixture;
(b) at least one phosphate component selected from the group consisting of ammonium polyphosphate (APP) and melamine phosphates, and mixtures thereof, and;
(c) at least one metal or metalloid oxide particle having a maximum particle size of less than 300 μm, wherein the metal or metalloid is selected from the group consisting of Mg, and Al, and wherein said at least one phosphate component is present in an amount ranging from 20 to 45% by weight based on 100% by weight of the formulation.

14 Claims, 1 Drawing Sheet

POLYURETHANE FLAME RETARDANT FORMULATION

CROSS-REFERENCE TO RELATED APPLICATIONS

This application is the National Phase of International Application PCT/EP2012/052223 filed Feb. 9, 2012 which designated the U.S. and which claims priority to European App. Serial No. 11156519.8 filed Mar. 2, 2011. The noted applications are incorporated herein by reference.

FIELD OF THE INVENTION

The present invention relates to formulations suitable to provide polyurethane and polyurethanes obtained by reacting said formulations.

BACKGROUND TO THE INVENTION

Formulations suitable to provide polyurethane (PU) and polyurethanes obtained by reacting said formulations are well known in the art. Polyurethane, mainly flexible and rigid foams, is used in transportation, refrigeration, home furnishing, building and construction, marine, and business machines. For many of these products, it is necessary to add flame retardants to the polyurethane. However, since most of the end applications are internal, polyurethane is in a critical situation and directly subjected to increasingly stringent regulations which on one side require high fire safety standards and on the other side limit the use of potentially toxic but extremely effective flame retardants.

This is the case of halogenated flame retardants. Halogenated fire retardants are generally very effective, requiring relatively small quantities to be added in the final product in order to obtain outstanding flame retardant properties, but they have been included in the list of priority pollutant as a hazardous priority pollutant, and their use is being limited.

Another point to be considered is that flame retardants can actually reduce the product's physical properties, cause processing problems and shorten the useful life of a product if they are not compatible with the material itself or other additives. Some halogenated flame retardants are very effective at concentrations of a few percent whereas many inorganic flame retardants require concentrations of 30% or higher, thus degrading the mechanical value of the plastic part. When more environmental-friendly flame retardants are used in the place of halogenated compounds, such as inorganics or melamine, a compromise has to be found between the achieving of acceptable fire properties and the high load required, which is detrimental to the material performance.

This is especially important for PU foams that, on one hand are more flammable because of their cellular structure and on the other hand are strongly affected by the addition of flame retardant which can affect the complex cell structure of the foam, thus reducing the final mechanical and insulation properties.

EP 0512629 discloses the use of zinc borate in combination with encapsulated ammonium polyphosphate in thermoplastic urethanes. The flame retardant combination must contain, in addition to zinc borate, a "carbonific" (polyhydric char-forming) compound such as pentaerythritol. However, there remains a need for halogen-free fire retardant formulations able to produce improved fire performances at reduced loading of additives.

It is an object of the present invention to improve the fire resistance of polyurethane products.

SUMMARY OF THE INVENTION

The present inventors have now found that these objects can be obtained by using a combination of a fire-resistant binder with a micro or nano-size metaloxide particle. This additive package can provide a dramatically improved and synergistic fire retardant behavior, while maintaining the excellent performance characteristics of polyurethane.

According to a first aspect of the present invention, a formulation suitable to provide polyurethane is provided. The formulation comprises:
(a) at least one polyurethane forming mixture;
(b) at least one phosphate component selected from the group consisting of ammonium polyphosphate (APP), and melamine phosphates and mixtures thereof, and;
(c) at least one metal or metalloid oxide particle having a maximum particle size of less than 300 μm, wherein the metal or metalloid is selected from the group consisting of Mg, Al and Si.

According to a second aspect, the present invention also encompasses a polyurethane product, obtained by reacting a formulation according to the first aspect of the invention.

The polyurethane products obtained by reacting a formulation according to the first aspect of the present invention surprisingly show improved fire resistance properties. This combination of ingredients produces a reduction of peak heat release rate (PHRR) and total heat released (THR) in cone calorimeter experiments and a strong increase of the Limiting Oxygen Index (LOI) value. The invention can be used to achieve extremely high fire performances.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. The reference figures quoted below refer to the attached drawings.

DETAILED DESCRIPTION OF THE INVENTION

Figure 1:
FIG. 1 represents digital photos of char residues after cone calorimeter testing. (a) Formulation comprising 70% by weight polyurethane (PU) and 30% by weight of ammonium polyphosphate (APP), (b) Formulation comprising 70% by weight PU and 29% by weight of APP and 1% by weight of magnesium oxide nano-particles (nMgO), (c) Formulation comprising 70% by weight PU and 28% by weight of APP and 2% by weight of nMgO, (c) Formulation comprising 70% by weight PU and 25% by weight of APP and 5% by weight of nMgO.

Before the present formulations of the invention are described, it is to be understood that this invention is not limited to particular formulations described, since such formulation may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments.

Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The present invention relates to a formulation also referred herein as "flame retardant formulation", comprising:
(a) a polyurethane (PU) forming mixture;
(b) at least one phosphate component selected from the group consisting of ammonium polyphosphate (APP) and melamine phosphates and mixtures thereof, preferably the phosphate component comprises or even consists of ammonium polyphosphate and;
(c) at least one metal or metalloid oxide particle having a maximum particle size of less than 300 μm, wherein the metal or metalloid is selected from the group consisting of Mg, Al and Si, preferably Mg, and Al, more preferably Mg.

According to embodiments of the present invention, the phosphate component may comprise at least one melamine phosphate selected from the group consisting of melamine orthophosphate, melamine pyrophosphate and melamine polyphosphate.

Preferably, particles of magnesium oxide are used. More preferably the magnesium oxide particles are micro-, or nano-particles.

Micro or nano-sized particles are preferred in order to optimize other relevant properties of the material such as mechanical properties or foam morphology. For example, particles smaller than 300 μm are preferred in order to minimize disruption of the foam cell structure.

As used throughout this application, "micro-particles" "micron-particles" "micron-sized particles" "micro-sized particles" are particles having an average diameter of between 0.1 μM and 300 μm, more preferably 0.1 μm and 150 μm. As also used throughout this application, "nano-particles" or "nano-sized particles" are particles having an average diameter of between 1 nanometer and 100 nanometers.

Preferably, the at least one metal or metalloid oxide particle has a maximum particle size (D99) of less than 300 μm, preferably of less than 200 μm, preferably of less then 170 μm, preferably of less than 150 μm, preferably of less than 100 μm, preferably of less than 50 μm, for example of less than 30 μm, for example of less than 20 μm, for example of less than 10 μm.

As used herein, particle average size may be expressed as "Dxx" where the "xx" is the volume percent of that particle having a size equal to or less than the Dxx. The D99 is defined as the particle size for which ninety-nine percent by volume of the particles has a size lower than the D99. The D50 can be measured by sieving, by BET surface measurement, or by laser diffraction analysis.

The metal or metalloid oxides for use in the present invention are selected from magnesium oxide, aluminum oxide or silicon oxide, or mixture thereof, preferably magnesium oxide. The metal or metalloid oxide particles for use in the invention comprises, preferably even consists, of oxides or hydroxides of these elements, though it is understood that in the context of this invention, other elements or components present as impurities may form part of the particle.

The amount of the metal or metalloid oxide particles, preferably of magnesium oxide particles in the formulation can range from 0.2 to 10% by weight based on 100% by weight of the formulation, e.g., from 0.2% to 8% by weight. Preferably, the amount of magnesium oxide in the formulation is ranging between 0.5% to 6% by weight.

Preferably, the ratio of weight % of the at least one metal or metalloid oxide particle over the weight % of the phosphate component is in the range of 0.01 to 0.3, preferably 0.01 to 0.2, preferably from 0.02 to 0.14, more preferred in the range of 0.02 to 0.11 yet more preferably from 0.03 to 0.08. The weight % of the phosphate component and the weight % of the particles both refer to the weight of the component, either the particles or the phosphate, over the total weight of the formulation.

According to embodiments, the formulation can further comprise Zinc (Zn) and/or Boron (B) oxides particles, such as zinc borate particles.

The amount of the Zn and/or B oxide particles, preferably of zinc borate particles in the formulation can range from 0.2 to 10% by weight based on 100% by weight of the formulation, e.g., from 0.2% to 8% by weight. Preferably, the amount of zinc borate in the formulation is ranging between 0.5% to 6% by weight based on 100% by weight of the formulation.

Preferably, the ratio of weight % of the Zn and/or B oxide particles over the weight % of the phosphate component is in the range of 0.01 to 0.3, preferably from 0.02 to 0.25, more preferred in the range of 0.02 to 0.2 yet more preferably from 0.03 to 0.20. The weight % of the phosphate component and the weight % of the particles both refer to the weight of the component, either the particles or the phosphate, over the total weight of the formulation.

According to the invention, the formulation comprises a phosphate component selected from the group consisting of ammonium polyphosphate and melamine phosphates, and mixtures thereof.

Ammonium polyphosphate is known and described as, for example, a flame retardant. Ammonium polyphosphate is an inorganic salt of polyphosphoric acid and ammonia. The chemical formula of ammonium polyphosphate is $[NH_4PO_3]_n$ and corresponds to the general formula (I), wherein n is greater than 100:

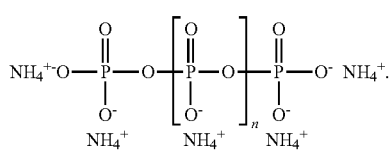

(I)

The chain length (n) of this polymeric compound is both variable and can be branched, and can be greater than 100, preferably greater than 1000. Preferably the ammonium polyphosphate has the general formula (II):

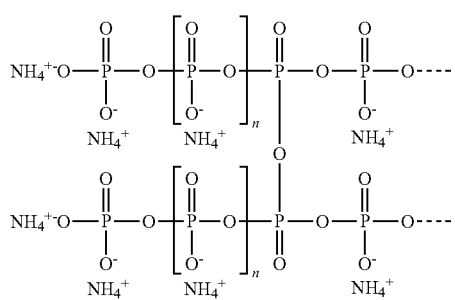

(II)

with n greater than 100, preferably greater than 1000.

The phosphate component can be a melamine phosphate compound selected from the group consisting of melamine orthophosphate, melamine pyrophosphate and melamine polyphosphate, or a mixture thereof. The melamine phosphate compound has general formula (III):

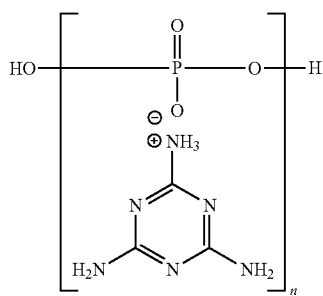

(III)

wherein n=1 is melamine-orthophosphate, n=2 is melamine-pyrophosphate; n>2 is melamine-polyphosphate.

The phosphate component may or may not be encapsulated. Suitable non encapsulated phosphate component can be readily available commercially, under the tradename Exolit AP-422 from Clariant, FR Cros 484 from Budenheim, Antiblaze LR3 from Albemarle, APP1001 from Dgtech International and Aflammit PCI-202 from Thor. Preferably the phosphate component, in particular a polyphosphate, is encapsulated.

Suitable encapsulated ammonium polyphosphate are described in U.S. Pat. Nos. 4,347,334, 4,467,056, 4,514,328, and 4,639,331 hereby incorporated by reference. Such encapsulated ammonium polyphosphates contain a hardened, water insoluble resin enveloping the individual ammonium polyphosphate particles. The resin may be a phenol-formaldehyde resin, an epoxy resin, a surface reacted silane, a surface reacted melamine or a melamine-formaldehyde resin. As an example for use is the encapsulated ammonium polyphosphate flame retardant available under the trademark FR CROS C 60, FR CROS C30, FR CROS C70 from Chemische Fabrik Budenheim, Budenheim am Rhein, Germany, EXOLIT 462 from Hoechst Celanese Corporation, Somerville, N.J. For example, the encapsulated ammonium polyphosphate flame retardant can be a melamine-formaldehyde encapsulated ammonium polyphosphate additive.

Suitable encapsulated melamine compounds are described in U.S. Pat. No. 6,015,510 hereby incorporated by reference. Such melamine compounds contain an outer coating. Such coating compounds may comprise organo silanes such as alkyl silanes, amino silanes, mixtures of alkyl silanes and polysiloxanes; esters; polyols; dicarboxylic acids; aromatic or aliphatic dianhydrides; melamine formaldehyde; and mixtures thereof.

The total amount of phosphate component or components, preferably comprising or even consisting of ammonium polyphosphate, is present in an amount ranging from 20 to 45% by weight based on 100% by weight of the formulation, preferably from 25 to 40% by weight. The phosphate component or components may be introduced in the formulation by using a flame retardant composition comprising the phosphate component or components.

According to the invention, the formulation comprises at least one polyurethane forming mixture. Preferably the at least one polyurethane forming mixture is present in the formulation in an amount ranging from 30 to 90% by weight based on 100% by weight of the formulation, preferably from 50 to 80% by weight, more preferably from 60 to 75% by weight.

According to embodiments of the invention, the polyurethane forming mixture may comprise:
at least one isocyanate compound; and
at least one isocyanate reactive component.

The present invention is useful for its flame retardant effects in polyurethane and polyurea materials and in particular in polyurethane and polyurea foams. Polyurea materials can be made by reacting an isocyanate compound, preferably a polyisocyanate and at least one polyamine and polyurethanes can be made by reacting an isocyanate compound preferably polyisocyanates with one of more polyols.

Polyamine may be selected from any suitable type of polyamines, such as polyether polyamines.

Isocyanate compounds are preferably polyisocyanate compounds. Suitable polyisocyanates used may be aliphatic, araliphatic and/or aromatic polyisocyanates, typically of the type $R-(NCO)_x$ with x being at least 2 and R being an aromatic, aliphatic or combined aromatic/aliphatic group.

Examples of R are diphenylmethane, toluene, dicyclohexylmethane, hexamethylene, or groups providing a similar polyisocyanate.

Non-limiting examples of suitable polyisocyanates are diphenylmethane diisocyanate (MDI)-type isocyanates in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above), with components containing isocyanate-reactive hydrogen atoms forming polymeric polyisocyanates or so-called prepolymers. Other examples are tolylene diisocyanate (also known as toluene diisocyanate, and referred to as TDI), such as 2,4 TDI and 2,6 TDI in any suitable isomer mixture, hexamethylene diisocyanate (HMDI or HDI), isophorone diisocyanate (IPDI), butylene diisocyanate, trimethylhexamethylene diisocyanate, di(isocyanatocyclohexyl)methane, e.g. 4,4'-diisocyanatodicyclohexylmethane ($H_{12}$MDI), isocyanatomethyl-1,8-octane diisocyanate and tetramethylxylene diisocyanate (TMXDI), 1,5-naphtalenediisocyanate (NDI), p-phenylenediisocyanate (PPDI), 1,4-cyclohexanediisocyanate (CDI), tolidine diisocyanate (TODI), any suitable mixture of these polyisocyanates, and any suitable mixture of one or more of these polyisocyanates with MDI-type polyisocyanates.

The polyurethane is generally prepared by reacting a polyisocyanate with isocyanate reactive components which are typically components containing isocyanate-reactive hydrogen atoms, such as a hydroxyl terminated polyester (polyester polyols), a hydroxyl terminated polyether (polyether polyols), a hydroxyl terminated polycarbonate or mixture thereof, with one or more chain extenders, all of which are well known to those skilled in the art.

The hydroxyl terminated polyester intermediate (polyester polyols), can be generally a linear polyester having a number average molecular weight (Mn) of from about 500 to about 10000, desirably from about 700 to about 5000, and preferably from about 700 to about 4000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e. the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propandiol, 1,4-cyclohexanedimethanol, decamethylene glycol, dodecamethylene glycol, and the like. 1,4-Butanediol is the preferred glycol.

Hydroxyl terminated polyether intermediates are preferably polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethyl glycol) (PTMG) comprising water reacted with tetrahydrofuran (THF). Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of glycerol and ethylene oxide or glycerol and propylene oxide. The various polyether intermediates generally have a number average molecular weight (Mn), as determined by assay of the terminal functional groups which is an average molecular weight, of from about 500 to about 10000, desirably from about 500 to about 5000, and preferably from about 700 to about 3000.

Hydroxyl terminated polycarbonate intermediates can be prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6, 2,2,4-trimethylhexanedion-1,6, decanediol-1,10, hydrogenated dilinoleylglycol, hydrogenated diolelylglycol; and cycloaliphatic diols such as cyclohexanediol-1,3, dimethylolcyclohexane-1,4, cyclohexanediol-1,4, dimethylolcyclohexane-1,3,1,4-endomethylene-2-hydroxy-5-hydroxymethyl cyclohexane, and polyalkylene glycols. The diols used in the reaction may be a single diol or a mixture of diols depending on the properties desired in the finished product.

Non-limiting examples of suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate and 2,4-pentylene carbonate.

Also suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm Hg in the presence or absence of an ester interchange catalyst, while removing low boiling glycols by distillation.

More specifically, the hydroxyl terminated polycarbonates can be prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10000 but in a preferred embodiment, it will be in the range of 500 to 2500.

Non-limiting examples of suitable extender glycols (i.e., chain extenders) are lower aliphatic or short chain glycols having from about 2 to about 10 carbon atoms and include, for instance, ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl)ether, neopentylglycol, and the like, with 1,4-butanediol and hydroquinone di(hydroxyethyl)ether being preferred.

The polyurethane is generally made from the abovementioned isocyanate reactive component such as a hydroxyl terminated polyester, polyether, or polycarbonate, preferably polyether, which is further reacted with a polyisocyanate, preferably a diisocyanate, along with extender glycol.

The formulation can also comprises non-fire-retardant mineral fillers such as certain oxides, carbonates, silicates, borates, stannates, mixed oxide hydroxides, oxide hydroxide carbonates, hydroxide silicates, or hydroxide borates, or a mixture of these substances. By way of example, use may be made of calcium oxide, aluminum oxide, manganese oxide, tin oxide, boehmite, dihydrotalcite, hydrocalumite, or calcium carbonate. Preferred compounds are silicates and hydroxide silicates. These fillers are usually added in amounts of between 1 to 20% by weight based on the formulation, preferably between 1 and 10% by weight.

Other additives apart from the fillers may be used in the formulation of this invention. Additives such as catalysts, stabilizers, lubricants, colorants, antioxidants, antiozonates, light stabilizers, UV stabilizers and the like may be used in amounts of from 0 to 5 wt % of the composition, preferably from 0 to 2 wt %.

When the formulation is reacted, polyurethane (PU) products, e.g. thermoplastic PU (also referred to as TPU), or soft, semi-rigid or rigid PU foams, may be provided. Foams can be made by using chemical or inert blowing agents while conducting above reactions or by using a gas in order to create a froth during these reactions. A useful chemical blowing agent is water. Non foam polyurethane and polyurea materials may be made in a similar way, in absence of a blowing agent. The foams may be rigid, semi-rigid, flexible and microcellular elastomeric; they may have an integral skin or not and they may be made in a mould, on a laminator or a slabstock machine Densities of the foams may vary widely e.g. 10-1000 kg/m$^3$.

The present invention also encompasses a polyurethane product, obtained by reacting a formulation according to the invention. In some embodiments, the polyurethane product may be a thermoplastic polyurethane product. In other embodiments, the polyurethane product may be a polyurethane elastomeric product. In yet other embodiments, the polyurethane product may be a polyurethane foam, such as a polyurethane flexible foam or a polyurethane rigid or semi-rigid foam. In yet other embodiments, the polyurethane product may be a polyurethane coating.

The polyurethane products obtained by reacting a formulation according to the first aspect of the present invention surprisingly show improved fire resistance properties. Though the theory behind is not completely understood, there seems to be a synergetic effect of the presence of both the phosphate or phosphates and the very small, micron or nano-dimensional metal oxide particles on the fire resistive behaviors of the polyurethane material obtained.

There are a number of ways to test the efficacy of flame retardants. One standard that is typically used is ASTM E 1354-08, "Standard Test Method for Heat and Visible Smoke release Rates for Materials and Products Using an Oxygen Consumption calorimeter", approved Jan. 1, 2008. This test method provides for the measurement of the time to sustained flaming, heat release rate (HRR), peak and total heat released (THR). Heat release data at different heating fluxes can also be obtained by this method. The sample is oriented horizontally, and a spark ignition source is used. Cone calorimetry has long been a useful tool for quantitating material flammability. Cone calorimetry analysis of UL-94 V-rated plastics is described, for example, by A. Morgan and M. Bundy, Fire Mater, 31, 257-283 (2007). Another important measurement of flame retardancy is provided by the FIGRA or fire growth rate which is calculated as: (FIGRA)= Peak HRR/time to Peak HRR (kW/m$^2$ sec). All these parameters can also be determined by using a Mass Loss calorimeter instead of an Oxygen Consumption calorimeter. Limiting Oxygen Index (LOI) can be measured using a Stanton Redcroft instrument according to the standard ASTM 2863 (standard test method for measuring the minimum oxygen concentration to support candle like combustion of plastics ASTM D2863/77 Philadelphia Pa. American Society for Testing and Materials 1977). The data for the Examples have been presented using some of these measurements.

Unexpectedly, it was found that when a minor amount of small metal oxide particles, of micron or of nanoparticle size according to the invention, is used in combination with a phosphate component selected according to the invention, preferably APP, and used in the ranges according to the invention, not only the heat release of the polyurethane is reduced, but also the Limiting Oxygen Index (LOI) of the polyurethane is significantly increased. This effect is likely to be the result of a synergetic effect of the small particles of metal oxide and the phosphates.

The polyurethane products obtained, when subjected to cone calorimeter experiment, shows on the one hand a significant reduction of the peak of heat release (PHRR, expressed in $kW/m^2$), the total heat release (THBR, expressed in $kW/m^2$) and improves the ratio PHRR/Tig, Tig being the time to ignition, whereas simultaneously, the Limiting Oxygen Index (LOI) is significantly increased. The Limiting Oxygen Index (LOI) refers to the minimum concentration of oxygen in an oxygen-nitrogen mixture, required to just support downward burning of a vertically mounted test specimen.

The invention is illustrated but not limited by the following examples.

EXAMPLES

Examples 1-2

Table 1

The samples of Examples 1-2 are based on polyurethane rigid coating formulation obtained by polymerizing 52 parts of polyol Jeffox WL440 (Huntsman PP) with 48 parts of isocyanate Suprasec 2020 (Huntsman PU) using 0.4 parts of catalyst Dabco 25S (Air Products).

Ammonium polyphosphate (Exolit AP 422, Clariant) was dispersed in both polyol and isocyanate by high shear mixing using a Dispermat at 4000 rpm for 30 minutes. The fraction of APP to be added to each stream was calculated in proportion to the polyol/isocyanate weight fraction. The required amount of metal or metalloid oxide particles was then added to the polyol (or to the dispersion of APP in polyol) and mixed by high shear mixing using a Dispermat at 4000 rpm for 1 hour followed by sonication for 20 minutes (2 sec active-2 sec rest) at 40% amplitude using a Sonic VCX 600. The high shear mixing step was performed under a nitrogen flow in order to avoid the incorporation of moisture contained in the air.

For the preparation of the castings, the appropriate amount of each masterbatch (Polyol/APP/particles and Isocyanate/APP) was weighed in paper cups. The catalyst was added in the polyol cup and the solution was homogenized using a disposable spatula. The isocyanate/APP was quickly added in the mixture containing polyol/APP/particles. The blend was mixed with the disposable spatula until the mixture started to heat up. Then the formulation was quickly poured in a pre-heated Teflon mould. The mould was pre-heated in an oven at 80° C. and pulled out just before preparing the casting so to keep it hot. The casting was then post-cured in an oven at 80° C. for 1 hour.

The flammability and thermal behavior of comparative formulations and formulations according to embodiments of the invention were measured using the limited oxygen index (LOI), and the cone calorimeter test.

LOI was measured using a Stanton Redcroft instrument on (100×10×4) $mm^3$ bar specimen according to the standard ASTM 2863 (standard test method for measuring the minimum oxygen concentration to support candle like combustion of plastics ASTM D2863/77 Philadelphia Pa. American Society for Testing and Materials 1977).

Figure 2:
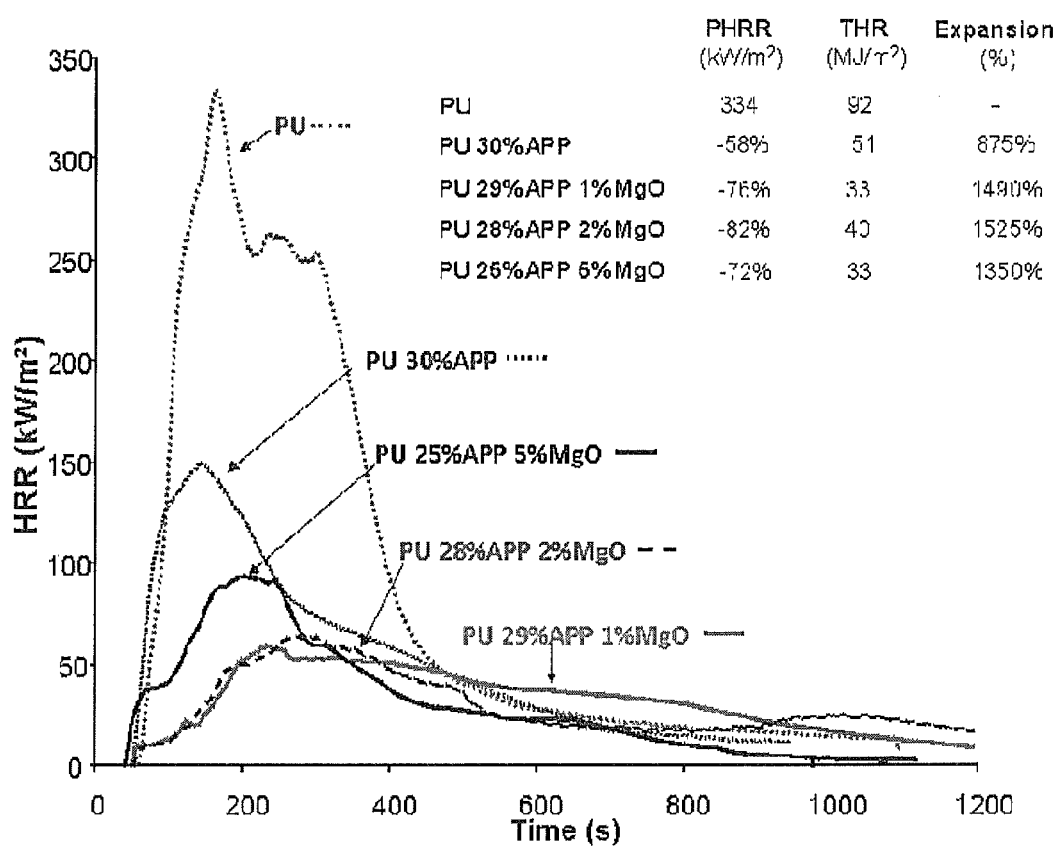
FIG. 2 represents heat release rate (HRR) curves obtained from cone calorimeter test at an incident heat flux of 50 kW/m², for formulation comprising PU only, PU and APP, and for formulations according to embodiments of the invention comprising PU, APP and MgO.

Samples were exposed to a FTT mass loss cone calorimeter under a heat flux of 50 $kW/m^2$. A spark ignition was used during the experiment to ignite the volatiles released by the samples. Values reported in Table 1 are the average of at least 3 measurements performed on each formulation. Curves reported in FIG. 2 represent typical trends.

Example 1

In this example Magnesium oxide particles were used: MgO nanoparticles supplied by Nanocerox (U.S.A). BET surface area was 79 $m^2/g$, corresponding to average primary particle size of 21 nm.

The flammability and thermal behavior of comparative formulations and formulations according to embodiments of the invention were measured using the limited oxygen index (LOI), and the cone calorimeter test.

The results of cone calorimeter test are shown in FIGS. 1 and 2.

FIG. 1 shows the flame-retardant effect of the combination APP/MgO. Digital photos of char residues after cone calorimeter testing are shown for:
(a) a formulation comprising 70% by weight polyurethane (PU) and 30% by weight of ammonium polyphosphate (APP) (FIG. 1a),
(b) a formulation comprising 70% by weight PU and 29% by weight of APP and 1% by weight of magnesium oxide particles (MgO) (FIG. 1b),
(c) a formulation comprising 70% by weight PU and 28% by weight of APP and 2% by weight of MgO (FIG. 1c), and
(c) a formulation comprising 70% by weight PU and 25% by weight of APP and 5% by weight of MgO (FIG. 1d).

Almost no char is left for the polymer comprising only PU and APP after the cone calorimeter tests—see FIG. 1(a)—while for PU/APP/MgO formulations—see FIGS. 1(b), 1(c) and 1(d)—a homogeneous, compact, and swelling char forms. The high-quality char effectively forms a protective layer that protect the underneath material from further combustion, thus helping to stop the transfer of heat and flammable volatiles and resulting in good flame retardancy.

FIG. 2 shows the HRR curves obtained from the cone calorimeter test at an incident heat flux of 50 $kW/m^2$ for formulation comprising PU only, PU and APP, and for formulations according to embodiments of the invention comprising PU, APP and MgO. HRR is a critical parameter and can be used to express the intensity of a fire. An effective flame-retardant system normally shows a low HRR value. The data in FIG. 2 shows that the pure PU burns very rapidly after ignition: a sharp HRR peak appears with a peak heat release rate (PHRR) as high as 334 $kW/m^2$.

The formulation comprising 70% by weight PU and 30% by weight of APP exhibits a typical intumescent behavior. Subjected to the heat source the material degrades releasing flammable gases that ignite and burn causing the first increase of HRR. At the same time, the increased temperature causes the APP to degrade and promote the intumescent barrier formation, leading to a decrease in the HRR value. After a prolonged time under the cone, the charred barrier degrades resulting in a second peak of HRR. The formation of the intumescent barrier is responsible for a reduction of PHRR by 58% with respect to the pure PU.

Surprisingly, for the formulations comprising 70% by weight PU and 29% by weight of APP and 1% by weight of MgO or 28% by weight of APP and 2% by weight of MgO, the intumescent protective barrier is so efficient that the initial part of the HRR curve is almost flat and very close to zero. The expansion of these samples is very pronounced (see FIG. 1) so that the residue swells until touching the conical heater of the cone calorimeter. This produced peaks of HRR which are much lower than that produced by pure PU formulation, or by PU and APP formulation.

For the formulation comprising 70% by weight PU and 25% by weight of APP and 5% by weight of MgO the intumescent barrier formed during combustion is not as efficient and a regular increase of HRR is observed. This demonstrates the decisive importance of the ratio of weight % of particle over the weight % of the phosphate component in order to achieve the optimum fire performance.

The results indicate that when MgO and APP are added to PU formulation, the material shows excellent flame retardancy ability. Moreover, compared with PU alone, or PU/APP formulations, cone calorimeter analysis of formulations according to embodiments of the invention shows a significant decrease of total heat release and lengthening of the time required to reach the PARR (thus reduction of FIGRA).

Example 2

In this example the tests were carried using the following metal or metalloid oxide particles:

Magnesium oxide particles: MgO particles supplied by Acros Organics. "Magnesium oxide, 98%, extra pure, powder, particle size: 99%<150 µm (−100 mesh)" D99<150 µm Aluminum oxide particles: $Al_2O_3$ nanoparticles supplied by Nanocerox (U.S.A). BET surface area is 54 $m^2/g$, corresponding to average primary particle size of 41 nm.

The flammability and thermal behavior of comparative formulations and formulations according to embodiments of the invention were measured using the limited oxygen index (LOI), and the cone calorimeter test.

The results are shown in Table 1. Data reported in Table 1 were obtained using a Mass Loss Cone calorimeter under a heat flux of 50 $kW/m^2$. To ensure the reproducibility of the experiments, each formulation was tested several times.

The results indicate that when minor amount of MgO or $Al_2O_3$ particles and APP are added to PU, the material shows excellent flame retardancy ability and the LOI increases significantly. Compared to PU alone, or PU/APP formulations, cone calorimeter analysis of formulations comprising minor amount of MgO or $Al_2O_3$ particles and APP shows a significant decrease in peak of heat release rate (PHRR) and total heat released.

In particular, formulations according to the invention, where APP is present in an amount ranging from 20 to 45% by weight based on 100% by weight of the formulation, showed the best flame retardancy, having the highest value of LOI and the lowest peak of heat release rate.

Furthermore, the best performance in terms of increased LOI and decreased peak of heat release rate is obtained for the formulations according to the invention where the ratio of weight % of particle over the weight % of the phosphate component is in the range from 0.034 to 0.071. When a larger fraction of particle is added (e.g. above 0.2) the LOI decreases below the value of the formulation containing PU and APP only.

Example 3

Table 2

In this example the following magnesium oxide particles were used:

Magnesium oxide particles: MgO particles supplied by Acros Organics. "Magnesium oxide, 98%, extra pure, powder, particle size: 99%<150 µm (−100 mesh)" D99<150 µm The samples of Example 3 are based on polyurethane elastomeric formulation obtained by polymerizing 48.4 parts of polyol Arcol 1374 (Bayer MaterialScience), 7.4 parts of

TABLE 1

| Reference | (f) | APP (wt %) | Metal oxides[a] (wt %) | (wt %) Metal oxide based on 100 wt % APP | PHRR[b] | THR[c] (MJ/m²) | Expansion[d] (%) | LOI[e] (vol %) |
|---|---|---|---|---|---|---|---|---|
| PU | | 0 | 0 | — | 334 kW/m² | 92 | — | 20 |
| PU-MgO-1.67 | | 0 | 1.67 | — | +28% | 86 | — | 20 |
| PU-MgO-3.33 | | 0 | 3.33 | — | +35% | 87 | — | 20 |
| PU-MgO-5 | | 0 | 5 | — | +26% | 83 | — | 20 |
| PU-APP/MgO-10/0 | | 10 | 0 | 0 | −53% | 65 | 1400 | 34 |
| PU-APP/MgO-8.33/1.67 | | 8.33 | 1.67 | 20 | −51% | 59 | 1300 | 25 |
| PU-APP/MgO-9.34/0.66 | | 9.34 | 0.66 | 7.1 | −70% | 36 | 2300 | 37 |
| PU-APP/MgO-9.67/0.33 | | 9.67 | 0.33 | 3.4 | −53% | 68 | 2600 | 39 |
| PU-APP/MgO-20/0 | | 20 | 0 | 0 | −61% | 51 | 890 | 34 |
| PU-APP/MgO-16.67/3.33 | | 16.67 | 3.33 | 20 | −57% | 61 | 1250 | 25 |
| PU-APP/MgO-18.67/1.33 | | 18.67 | 1.33 | 7.1 | −71% | 46 | 1700 | 46 |
| PU-APP/MgO-19.34/0.66 | | 19.34 | 0.66 | 3.4 | −72% | 49 | 930 | 48 |
| PU-APP/MgO-30/0 | | 30 | 0 | 0 | −58% | 51 | 875 | 40 |
| PU-APP/MgO-25/5 | I | 25 | 5 | 20 | −72% | 33 | 1350 | 26 |
| PU-APP/MgO-28/2 | I | 28 | 2 | 7.1 | −82% | 40 | 1525 | 57 |
| PU-APP/MgO-29/1 | I | 29 | 1 | 3.4 | −76% | 33 | 1490 | 64 |
| PU | | 0 | 0 | — | 351 kW/m² | 101 | — | 20 |
| PU-µMgO-5 | | 0 | 5 | — | −26% | 98 | — | 21 |
| PU-APP/µMgO-30/0 | | 30 | 0 | 0 | −45% | 56 | 875 | 40 |
| PU-APP/µMgO-25/5 | I | 25 | 5 | 20 | −83% | 24 | 1475 | 56 |
| PU-APP/µMgO-28/2 | I | 28 | 2 | 7.1 | −82% | 28 | 1500 | 68 |
| PU-APP/µMgO-29/1 | I | 29 | 1 | 3.4 | −78% | 35 | 1333 | 64 |
| PU | | 0 | 0 | — | 341 kW/m² | 93 | — | 20 |
| PU-Al₂O₃-5 | | 0 | 5 | — | +13% | 95 | — | 20 |
| PU-APP/Al₂O₃-30/0 | | 30 | 0 | 0 | −46% | 58 | 875 | 40 |
| PU-APP/Al₂O₃-28/2 | I | 28 | 2 | 7.1 | −84% | 23 | 1394 | 50 |
| PU-APP/Al₂O₃-29/1 | I | 29 | 1 | 3.4 | −77% | 23 | 1812 | 62 |

[a]Weight fraction of metal oxide particles, either nanoparticles (MgO•Al₂O₃) or micron-size particles (µMgO)
[b]Peak of Heat Release Rate
[c]Total Heat Released
[d]Expansion of the charred residue after cone calorimetry experiments
[e]Limiting Oxygen Index
[f]I indicated formulation according to the invention.

chain extender Daltoped AO 00009 (1,4 butanediol, Huntsman PU) with 43.8 parts of pre-polymer isocyanate Suprasec 2433 (Huntsman PU) using 0.4 parts of catalyst Dabco S25 (Air Products).

Melamine polyphosphate (Melapur 200/70, Ciba-BASF) was dispersed in both polyol and isocyanate prepolymer by high shear mixing using a Heidolph mixer equipped with a cowel blade at 4000 rpm for 40 minutes. The fraction of melamine polyphosphate to be added to each stream was calculated in proportion to the polyol/isocyanate weight fraction. The required amount of particles was then added to the polyol (or to the dispersion of melamine polyphosphate in polyol) and mixed by high shear mixing using a Heidolph mixer equipped with a cowel blade at 4000 rpm for 40 minutes followed by sonication for 20 minutes (2 sec active-2 sec rest) at 40% amplitude using a Sonic VCX 500. The high shear mixing step was performed under a nitrogen flow in order to avoid the incorporation of moisture contained in the air.

For the preparation of the elastomeric castings, the appropriate amount of polyol/melamine polyphosphate/particle was weighed in a paper cup, 1,4 butanediol was added and the mixture was mixed at 400 rpm for 10 minutes under vacuum. Then the proper amount of isocyanate/melamine polyphosphate was added to the mixture, which was then stirred under vacuum at 800 rpm for 60 seconds. The catalyst Dabco 25S was added drop by drop and the mixture was again stirred at 800 rpm for 20 seconds. At this step, the blend was quickly poured in an aluminum mould (preventively sprayed with release agent) placed on a hot plate at 85° C. After 1 hour the casting was removed and post cured at 85° C. for 24 hours in an oven.

The flammability and thermal behavior of comparative formulations and formulations according to embodiments of the invention were measured using the limited oxygen index (LOI), and the cone calorimeter test.

L.O.I. was measured using a Stanton Redcroft instrument on (100×10×4) mm$^3$ bar specimen according to the standard ASTM 2863 (standard test method for measuring the minimum oxygen concentration to support candle like combustion of plastics ASTM D2863/77 Philadelphia Pa. American Society for Testing and Materials 1977).

Samples were covered with a metal grid and exposed to an oxygen depletion cone calorimeter (Fire Instrumentation and Research Equipment) under a heat flux of 35 kW/m$^2$.

The results are shown in Table 2.

of the total heat released (THR) and fire growth rate (FIGRA).

It is to be understood that although preferred embodiments and/or materials have been discussed for providing embodiments according to the present invention, various modifications or changes may be made without departing from the scope and spirit of this invention.

The invention claimed is:

1. A formulation suitable to provide polyurethane, said formulation comprising:
    (a) at least one polyurethane forming mixture;
    (b) a phosphate compound selected from the group consisting of an ammonium polyphosphate (APP) compound or a melamine phosphate compound, and;
    (c) at least one metal oxide particle having maximum particle size of less than 300 μm,
    wherein the metal is selected from the group consisting of Mg and Al, and wherein said at least one phosphate component is present in an amount ranging from 20 to 45% by weight based on 100% by weight of the formulation; and wherein the formulation does not contain any other phosphate containing materials other than the phosphate compound.

2. The formulation according to claim 1, wherein the ratio of weight % of the at least one metal oxide particle over the weight % of the phosphate compound is in the range of 0.01 to 0.3.

3. The formulation according to claim 1, wherein said particle is magnesium oxide particle.

4. The formulation according to claim 1, wherein said formulation further comprises Zn and/or B oxides particles.

5. The formulation according to claim 1, wherein the phosphate compound comprises at least one compound selected from the group consisting of melamine orthophosphate, melamine pyrophosphate and melamine polyphosphate.

6. The formulation according to claim 1, wherein the phosphate compound is ammonium polyphosphate.

7. The formulation according to claim 1, wherein the phosphate compound is present in an amount ranging from 20 to 40% by weight based on 100% by weight of the formulation.

8. A polyurethane product, obtained by reacting a formulation according to claim 1.

TABLE 2

| Reference | MePo[f] (wt %) | Metal oxide[a] (wt %) | (wt %) Metal oxide based on 100 wt % MePo | PHRR[b] | THR[c] (MJ/m$^2$) | FIGRA[d] (kW/m$^2$s) | LOI[e] (vol %) |
|---|---|---|---|---|---|---|---|
| PU | 0 | 0 | — | 672 kW/m$^2$ | 92 | 4.5 | 22 |
| PU-MePo/μMgO-20/0 | 20 | 0 | 0 | −53% | 62 | 1.5 | 28 |
| PU-MePo/μMgO-16.67/3.33 | 16.67 | 3.33 | 20 | −53% | 60 | 1.7 | 24 |
| PU-MePo/μMgO-18.67/1.33 | 18.67 | 1.33 | 7.1 | −61% | 48 | 1.3 | 27 |
| PU-MePo/μMgO-19.34/0.66 | 19.34 | 0.66 | 3.4 | −67% | 47 | 1.4 | 27 |

[a]Weight fraction of metal phosphate particles,
[b]Peak of Heat Release Rate
[c]Total Heat Released
[d]Fire Growth RAte
[e]Limiting Oxygen Index
[f]MePo: Melamine polyphosphate The results indicate that when MgO and melamine polyphosphate are added to PU formulation, the material shows excellent flame retardancy ability. Moreover, compared with PU alone, or PU/melamine polyphosphate formulations, cone calorimeter analysis of formulations according to embodiments of the invention shows a significant decrease 9. The polyurethane product according to claim 8, wherein the polyurethane product is a thermoplastic polyurethane product.

10. The polyurethane product according to claim 8, wherein the polyurethane product is a polyurethane elastomeric product.

11. The polyurethane product according to claim 8, wherein the polyurethane product is a polyurethane foam.

12. The polyurethane product according to claim 8, wherein the polyurethane product is a polyurethane flexible foam.

13. The polyurethane product according to claim 8, wherein the polyurethane product is a polyurethane rigid or semi-rigid foam.

14. The polyurethane product according to claim 8, wherein the polyurethane product is a polyurethane coating.

* * * * *